United States Patent
Bowers et al.

(10) Patent No.: US 10,417,074 B2
(45) Date of Patent: Sep. 17, 2019

(54) SMS-BASED BACKUP NOTIFICATION SYSTEM FOR STORAGE SYSTEMS

(71) Applicant: International Business Machines Corporation, Armonk, NY (US)

(72) Inventors: John A. Bowers, Austin, TX (US); Joseph P. Edgar, Round Rock, TX (US); Andrew J. Laforteza, Austin, TX (US); Cyrus Niltchian, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 15/342,604

(22) Filed: Nov. 3, 2016

(65) Prior Publication Data

US 2018/0121281 A1 May 3, 2018

(51) Int. Cl.
*G06F 11/00* (2006.01)
*G06F 11/07* (2006.01)
*H04W 4/14* (2009.01)

(52) U.S. Cl.
CPC ...... *G06F 11/0769* (2013.01); *G06F 11/0709* (2013.01); *G06F 11/079* (2013.01); *G06F 11/0751* (2013.01); *H04W 4/14* (2013.01)

(58) Field of Classification Search
CPC ............. G06F 11/0769; G06F 11/0784; G06F 11/0787
See application file for complete search history.

(56) References Cited

U.S. PATENT DOCUMENTS

| | | | | |
|---|---|---|---|---|
| 8,566,839 | B2 * | 10/2013 | Johnson | G06Q 30/00 715/200 |
| 8,639,267 | B2 * | 1/2014 | Johnson | H04W 4/02 370/331 |
| 9,154,563 | B2 * | 10/2015 | Granito | H04L 51/04 |
| 9,729,696 | B2 * | 8/2017 | Shaju | H04M 1/72555 |
| 2008/0182622 | A1 | 7/2008 | Makarowski et al. | |
| 2012/0184333 | A1 * | 7/2012 | Lee | H04M 1/7253 455/556.1 |
| 2013/0036333 | A1 * | 2/2013 | Lee | G06F 11/0733 714/57 |
| 2016/0127277 | A1 | 5/2016 | Faulkner et al. | |
| 2016/0330067 | A1 * | 11/2016 | Liu | H04W 24/04 |

FOREIGN PATENT DOCUMENTS

WO WO2010023330 A1 3/2010

* cited by examiner

*Primary Examiner* — Christopher S McCarthy
(74) *Attorney, Agent, or Firm* — Nelson and Nelson; Daniel P. Nelson; Alexis V. Nelson

(57) ABSTRACT

A method for notifying a system administrator of a storage-system-related problem is disclosed. In one embodiment, such a method includes detecting a problem on a storage system comprising an array of storage drives. The method determines availability of a primary communication system used to notify a system administrator of the problem. In certain embodiments, this includes sending a message through the primary communication system and waiting for a response. In the event the primary communication system is available, the method notifies the system administrator of the problem through the primary communication system. In the event the primary communication system is not available, the method uses an SMS-based communication system to notify the system administrator of the problem. A corresponding system and computer program product are also disclosed.

20 Claims, 5 Drawing Sheets

SMS-BASED BACKUP NOTIFICATION SYSTEM FOR STORAGE SYSTEMS

BACKGROUND

Field of the Invention

This invention relates to systems and methods for notifying system administrators of storage-system-related problems.

Background of the Invention

Data is increasingly one of an organization's most valuable assets. Accordingly, it is paramount that an organization protect its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate policies and procedures to prevent such losses from occurring.

Because of the value of an organization's data, it is important that system administrators such as in-house technicians and third-party service personnel are alerted when problems or issues occur with storage systems that store the data. For this reason, some storage system vendors have developed notification systems to notify system administrators when problems or issues occur. For example, IBM storage systems such as IBM San Volume Controller (SVC) and IBM Storwize have a "call home" feature that generates and sends an email to a system administrator when a problem or issue occurs on the storage systems. The emails may contain detailed information about a problem such as a system log providing context to the problem, time and date the problem occurred, and type of problem that was detected.

Unfortunately, in a disaster-like situation, a notification system may experience problems and outages just like the storage system about which it is intended to report. For example, a disaster that affects a storage system may also affect a local area network, email server, or intranet or internet that sends the notification to a system administrator. The result is that the system administrator may not be notified of the problem in order to take appropriate remedial actions.

In view of the foregoing, what is needed is an improved system and method to notify system administrators of storage-system-related problems.

SUMMARY

The invention has been developed in response to the present state of the art and, in particular, in response to the problems and needs in the art that have not yet been fully solved by currently available systems and methods. Accordingly, the invention has been developed to provide improved systems and methods to notify system administrators of storage-system-related problems. The features and advantages of the invention will become more fully apparent from the following description and appended claims, or may be learned by practice of the invention as set forth hereinafter.

Consistent with the foregoing, a method for notifying a system administrator of a storage-system-related problem is disclosed herein. In one embodiment, such a method includes detecting a problem on a storage system comprising an array of storage drives. The method determines availability of a primary communication system used to notify a system administrator of the problem. In certain embodiments, this includes sending a message through the primary communication system and waiting for a response. In the event the primary communication system is available, the method notifies the system administrator of the problem through the primary communication system. In the event the primary communication system is not available, the method uses an SMS-based communication system to notify the system administrator of the problem.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
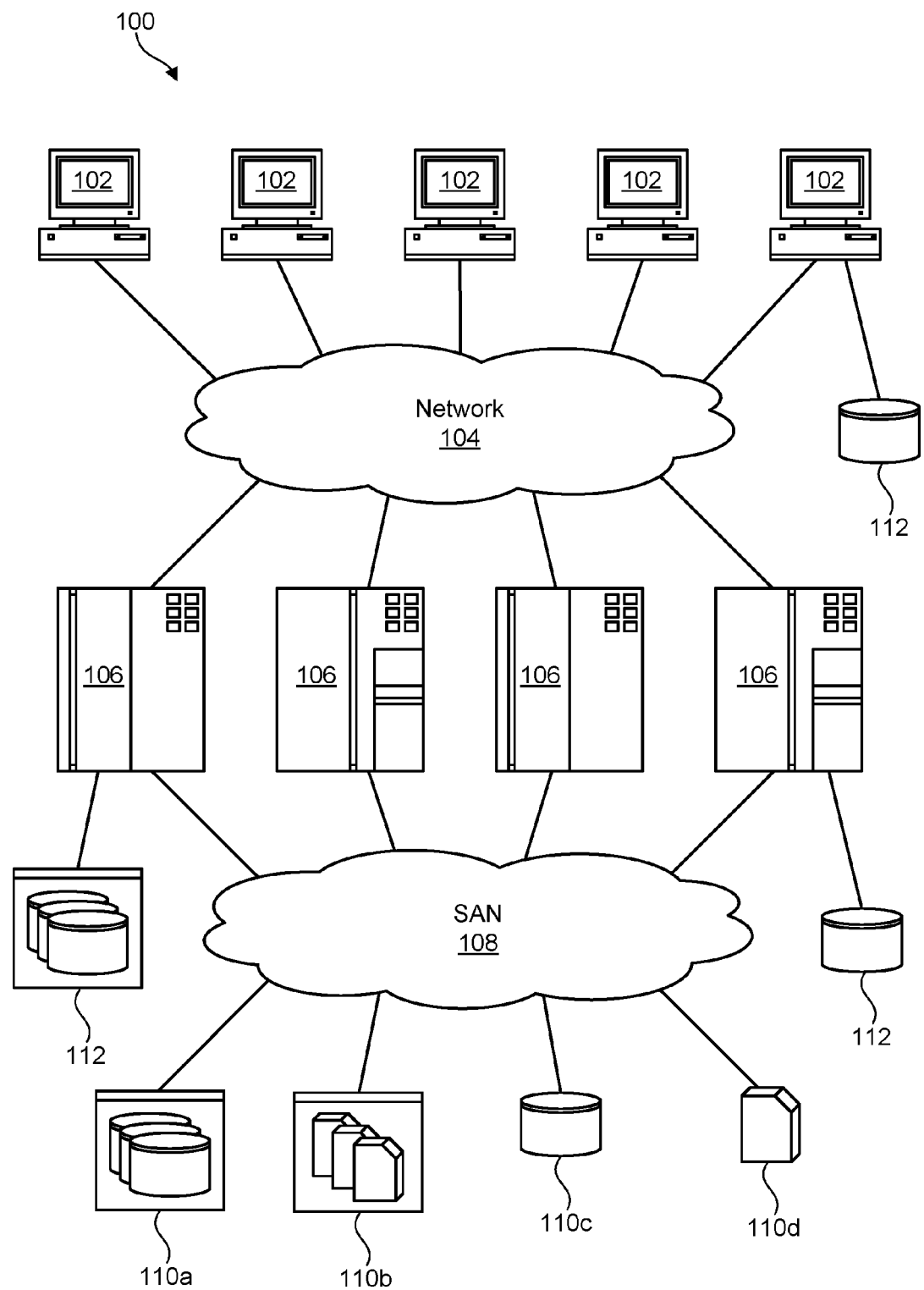
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
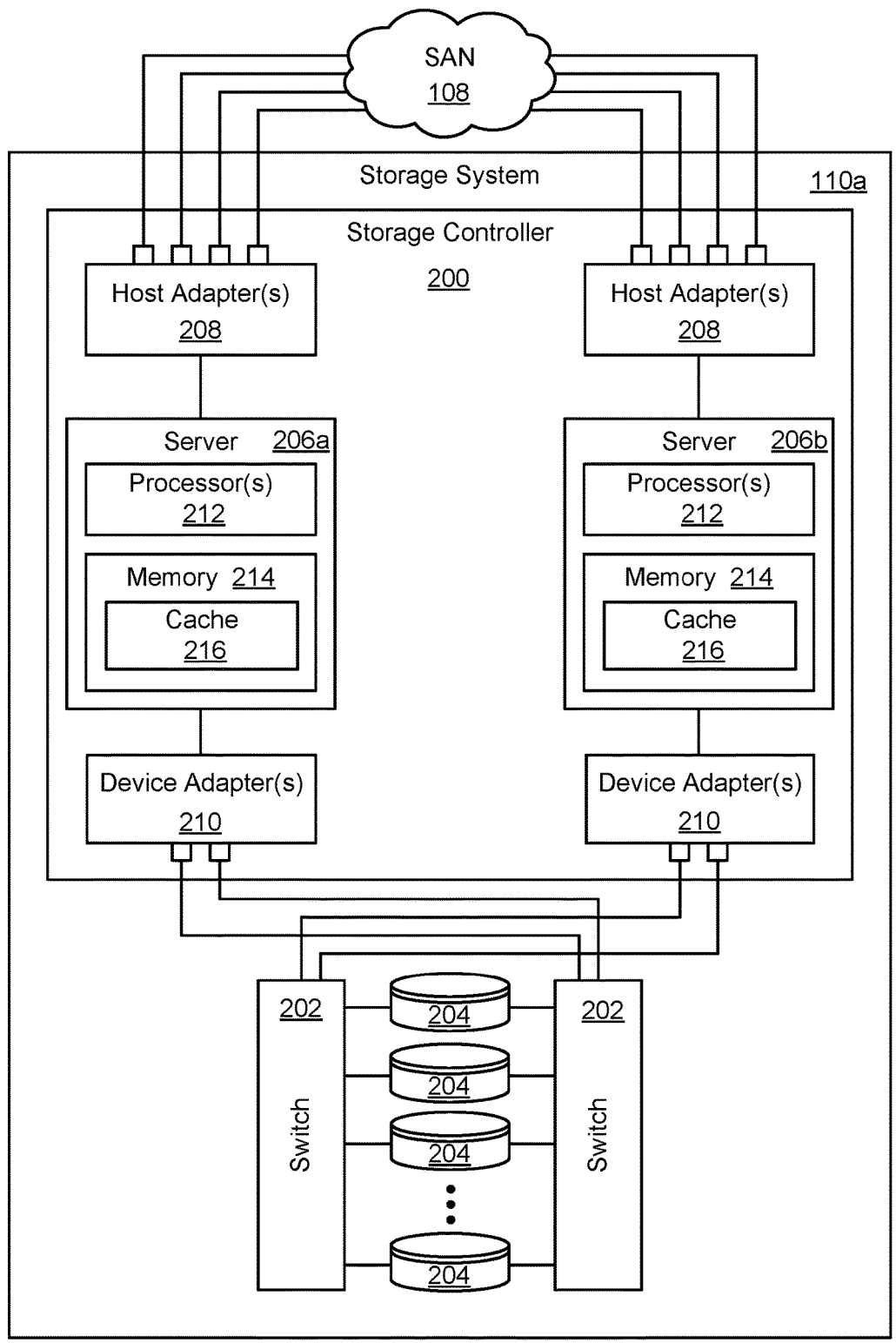
FIG. 2 is a high-level block diagram showing one embodiment of a storage system containing an array of storage drives, such as hard disk drives or solid state drives.

Referring to FIG. 2, one example of a storage system 110a containing an array of hard-disk drives 204 and/or solid-state drives 204 is illustrated. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system 110 that could benefit from one or more embodiments of the invention is deemed to fall within the scope of the invention. Thus, the IBM DS8000™ is presented only by way of example and not limitation.

Figure 3:
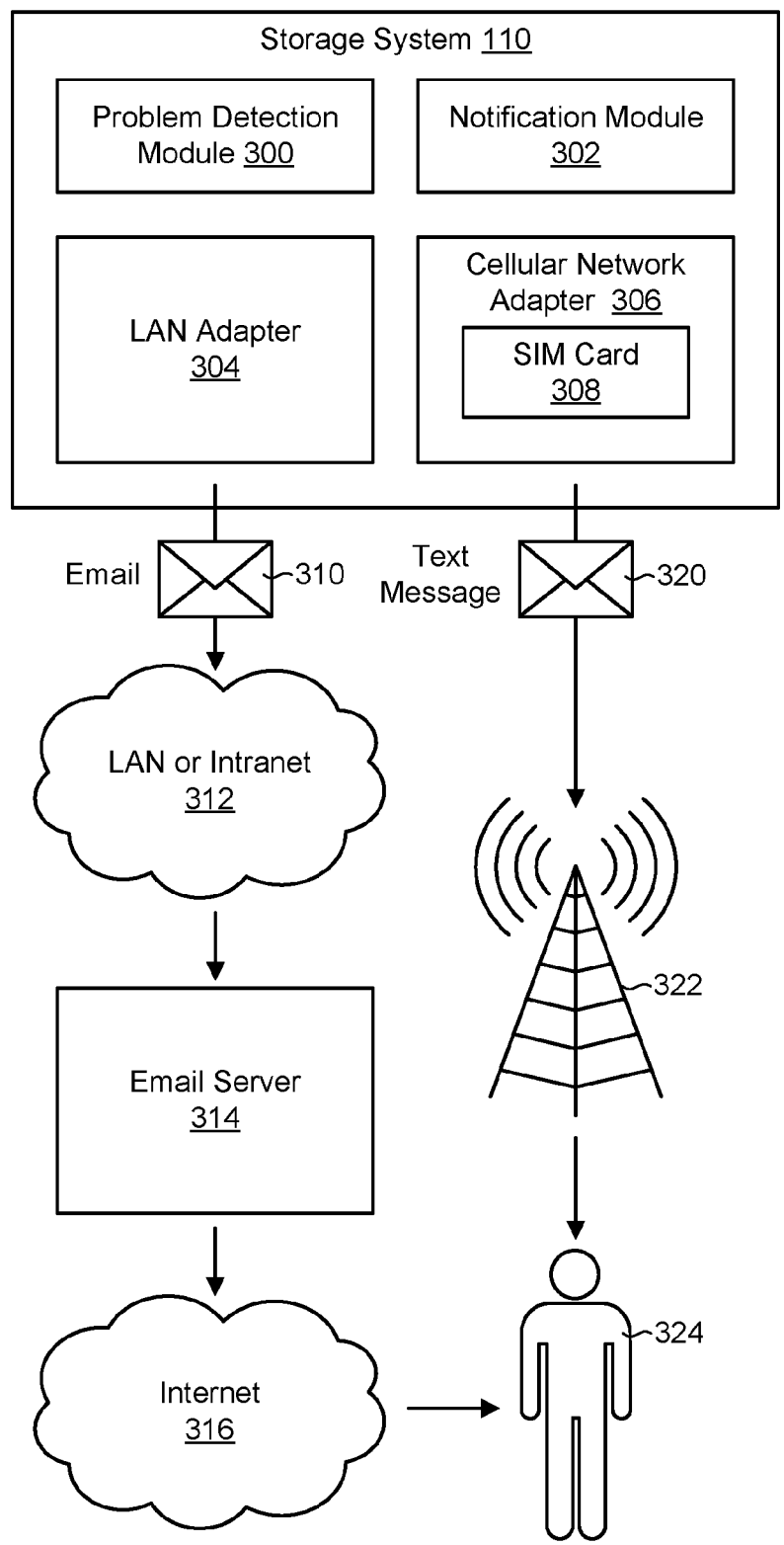
FIG. 3 is a high-level block diagram showing various communication systems for notifying a system administrator of a storage-system-related problem.

Referring to FIG. 3, as previously mentioned, because of the value of an organization's data, it is important for system administrators such as in-house technicians and third-party service personnel to know when problems or issues occur with storage systems 110 that store the data. For this reason, various storage system vendors have developed notification systems to notify administrators when problems or issues occur on a storage system 110. For example, IBM storage systems 110 such as the IBM San Volume Controller (SVC) and IBM Storwize have a "call home" feature that generates and sends an email to a system administrator when a problem or issue occurs on the storage systems. In certain cases, the emails may contain detailed information about a problem such as a system log providing context to the problem, time and date the problem occurred, and type of problem that was detected.

Unfortunately, in a disaster or catastrophic situation such as a flood, fire, earthquake, or the like, a notification system may experience problems and outages just like the storage system 110 about which it is supposed to report. For example, a disaster that affects a storage system 110 may also affect a local area network 312, email server 314, or intranet 312 or Internet 316 that sends the notification to the system administrator 324. The result is that a system administrator 324 may not be notified of a problem on the storage system 110 in order to take appropriate remedial actions.

FIG. 3 shows one embodiment of an improved system and method to notify a system administrator 324 of a storage-system-related problem even in the event of a disaster. As shown, a storage system 110 in accordance with the invention may include a problem detection module 300 and notification module 302. The problem detection module 300 may be configured to detect a problem on the storage system 110. This problem may be an error, a hardware or software failure, a system outage, a need for maintenance, a data integrity issue, a system timeout, an I/O performance issue, and/or the like.

When a problem is detected, the notification module 302 may attempt to notify a system administrator 324 of the problem so that remedial actions may be taken. These remedial actions may include physically visiting the site of the storage system 110 to perform maintenance or repairs on the storage system 110, remotely logging into the storage system 110 to perform various remedial actions, requesting service from a third-party or in-house technician to perform remedial actions, or the like.

As shown, the notification module 302 may interface with multiple notification systems in order to notify a system administrator 324 of a problem. For example, the notification module 302 may initially attempt to notify a system administrator 324 of the storage-system-related problem over a primary communication system. In one embodiment, the primary communication system is an email-based communication system. This email-based communication system may include an email client on the storage system 110 and a LAN adapter 304 (e.g., an Ethernet card or wireless WIFI adapter 304) configured to transmit the email 310 to one or more recipients. Once leaving the LAN adapter 304, the email 310 may traverse a local area network (LAN) 312 or intranet 312 (which may be a connected group of LANs) on its way to an email server 314. The email server 314 may transmit the email 310 over a network, such as the Internet 316, to a system administrator 324. The email 310 may pass through various pieces of intermediate equipment (e.g., routers, switches, servers, etc.) while making this journey.

As previously mentioned, an outage at a storage system 110 may be accompanied by an outage on the LAN 312, intranet 312, email server 314, or equipment making up the Internet 316, particularly if the storage system 110 is located at a same site as the LAN 312, intranet 312, email server 314, and/or Internet equipment. In such scenarios, the email 310 may not be able to reach the system administrator 324. As will be explained in more detail in association with FIGS. 4 and 5, various techniques may be used to determine if an email 310 actually reaches a system administrator 324.

In the event the primary communication system is not available (i.e., the email 310 is not able to reach the system administrator 324), the notification module 302 may send a message 320 over a secondary communication system. For example, the notification module 302 may be configured to send a text message 320 to a system administrator 324 over an SMS-based communication system. As shown, the text message 320 may be generated at the storage system 110 and transmitted through a cellular network 322 using a cellular network adapter 306 and Subscriber Identity Module (SIM) card 308 integrated into the storage system 110. An owner of the storage system 110 may maintain a cellular network subscription to access the cellular network 322. In certain embodiments, the cellular network adapter 306 and SIM card 308 have a battery backup to ensure they are available when other components of the storage system 110 or primary communication system are unavailable or shutting down due to a catastrophic or other event. Because a cellular network 322 is typically maintained by a third-party servicer provider, the cellular network 322 will likely be available even when other communication systems, such as the email system previously described, are not. This provides a more robust system for relaying information to a system administrator 324.

Figure 4:
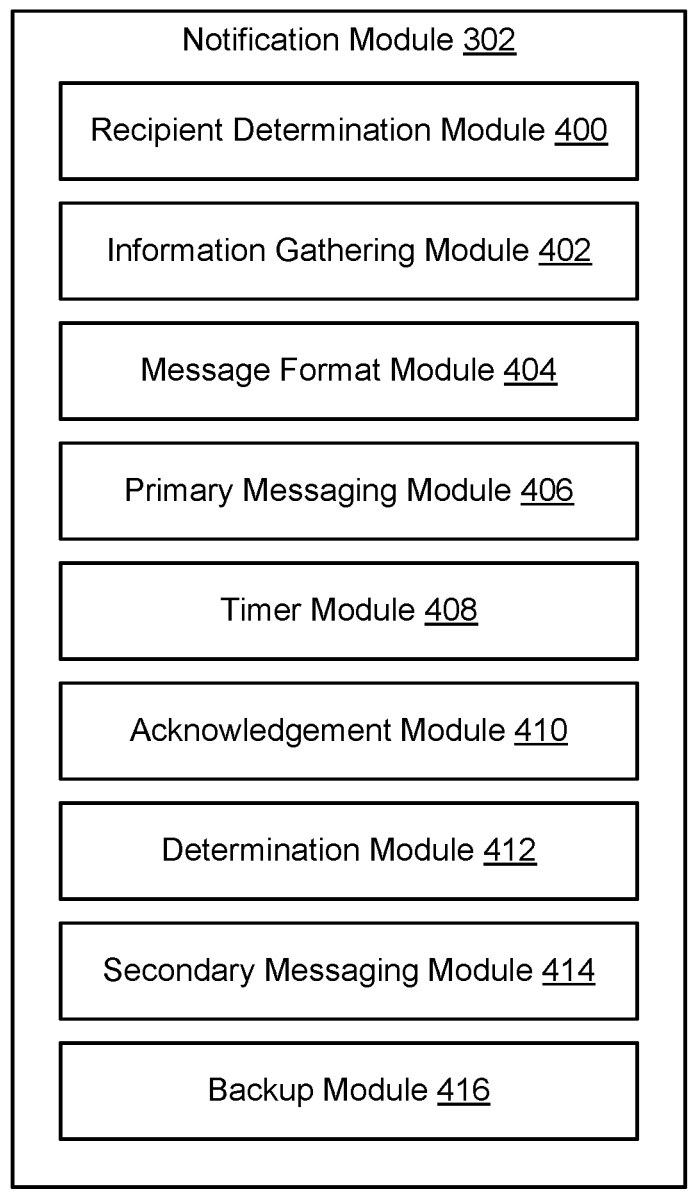
FIG. 4 is a high-level block diagram showing various sub-modules that may be included in a notification module in accordance with the invention.

Referring to FIG. 4, to provide the features and functions described above, the notification module 302 may include various sub-modules. These sub-modules may be implemented in hardware, software, firmware, or combinations thereof. The sub-modules are presented by way of example and are not intended to represent an exhaustive list of sub-modules that may be included in or associated with the notification module 302. The notification module 302 may include more or fewer sub-modules than those illustrated, or the functionality of the sub-modules may be organized differently. As shown, the notification module 302 may include one or more of a recipient determination module 400, information gathering module 402, message format module 404, primary messaging module 406, timer module 408, acknowledgement module 410, determination module 412, secondary messaging module 414, and backup module 416.

The recipient determination module 400 may determine or identify recipients for messages generated by the notification module 302. For example, the recipient determination module 400 may receive or be programmed with one or more email addresses, cellular phone numbers, or the like, associated with system administrators 324 that need to be notified of storage-system-related problems.

When the problem detection module 300 illustrated in FIG. 3 detects a storage-system-related problem, the information gathering module 402 may gather information related to the problem for inclusion in a message 310, 320. This may include, for example, error codes associated with a problem, systems logs or other information providing context to a problem, timing associated with a problem, descriptions of a problem, or the like. The message format module 404 may format the information for transmission to a user. This may include formatting the information in the form of an email 310, if the message is to be transmitted over the Internet 316, or a text message 320 if the message is to be transmitted over a cellular network 322.

The primary messaging module 406 may initially send the message (as an email 310 for example) over a primary communication system. Upon sending the message, a timer module 408 may initiate a timer to track how long it takes for the message to be acknowledged. The acknowledgement module 410, by contrast, may determine if and when an acknowledgement to the message is received from a system administrator 324. This acknowledgement may come in the form of a system administrator 324 logging into the storage system 110 to perform remedial actions, physically visiting the storage system 110 to perform maintenance or repairs thereon, or responding to the message in some other way, such as by responding the email 310 with a return message or email. Alternatively, the primary messaging module 406 may ping or send a message to an email server 314 and the acknowledgement module 410 may wait for a response to determine if the primary communication system is available. In this way, the acknowledgement module 410 may determine if an email server 314 is up and running.

Using the timer initiated by the timer module 408, the determination module 412 may determine whether an acknowledgement is received in a designated amount of time. If not, the secondary messaging module 414 may be invoked to attempt to communicate with the system administrator 324 using a secondary communication system (e.g., SMS-based communication system). Specifically, the secondary messaging module 414 may send a different type of message (e.g., a text message 320) to the system administrator 324 to notify him or her of the problem on the storage system 110. If conventional power is not available to the storage system 110 or the storage system 110 is shutting down, the backup module 416 may provide backup power to hardware (e.g., a cellular network adapter 306 and SIM card 308) associated with the secondary communication system so that the notification module 302 can recognize this situation and send out a text message. This will increase the odds that a message 320 will be received by the system administrator 324.

Figure 5:
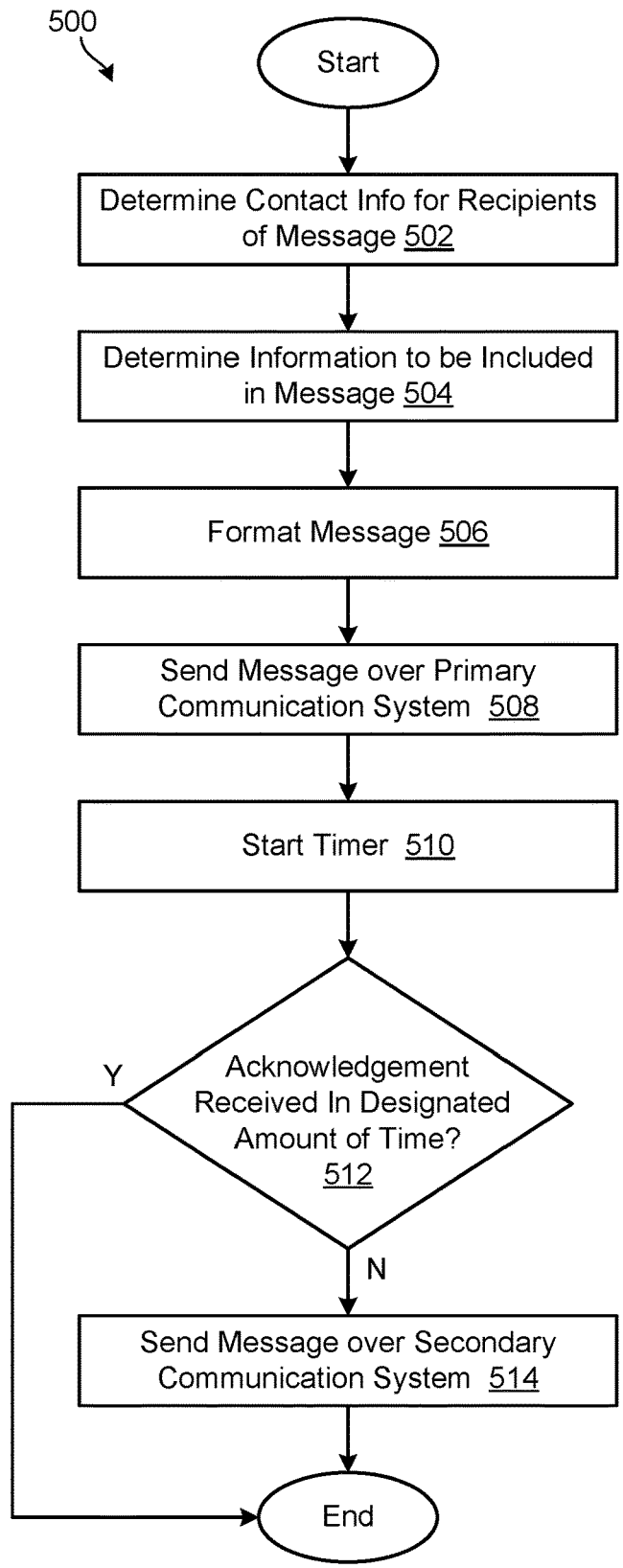
FIG. 5 is a process flow diagram showing one embodiment of a method for notifying a system administrator of a storage-system-related problem.

Referring to FIG. 5, one embodiment of a method 500 for notifying a system administrator 324 of a storage-system-related problem is illustrated. As shown, when a problem is detected, the method 500 initially determines 502 contact information for one or more recipients (e.g., system administrators 324) of a message. The method 500 then determines 504 information is to be included in the message and formats 506 the information accordingly. The method 500 then sends 508 the message over a primary communication system and starts 510 a timer. If, at step 512, the message is acknowledged in a designated (and possibly user-configurable) amount of time, the method 500 ends. If, however, the message is not acknowledged in the designated amount of time, the method 500 sends the message over a secondary communication system, such as an SMS-based communication system, and the method 500 ends.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for notifying a system administrator of a storage-system-related problem, the method comprising:
   detecting a problem on a storage system comprising an array of storage drives;
   determining availability of a primary communication system to notify a system administrator of the problem;
   in the event the primary communication system is available, notifying the system administrator of the problem through the primary communication system; and
   in the event the primary communication system is not available due to a catastrophic event, using an SMS-based communication system to notify the system administrator of the problem, wherein using the SMS-based communication system comprises communicating using a cellular network adapter and a SIM card installed on the storage system.

2. The method of claim 1, wherein determining availability of a primary communication system comprises sending a message through the primary communication system and waiting for a response.

3. The method of claim 2, wherein the primary communication system is determined to be available upon receiving the response.

4. The method of claim 2, wherein the primary communication system is determined to be unavailable upon not receiving the response for a selected amount of time.

5. The method of claim 1, wherein the primary communication system is an email-based communication system.

6. The method of claim 1, wherein using an SMS-based communication system further comprises communicating with the system administrator over a cellular network.

7. The method of claim 6, further comprising using a battery to provide backup power to the cellular network adapter and SIM card.

8. A computer program product for notifying a system administrator of a storage-system-related problem, the computer program product comprising a non-transitory computer-readable storage medium having computer-usable program code embodied therein, the computer-usable program code configured to perform the following when executed by at least one processor:
   detect a problem on a storage system comprising an array of storage drives;
   determine availability of a primary communication system to notify a system administrator of the problem;
   in the event the primary communication system is available, notify the system administrator of the problem through the primary communication system; and
   in the event the primary communication system is not available due to a catastrophic event, use an SMS-based communication system to notify the system administrator of the problem, wherein using the SMS-based communication system comprises communicating using a cellular network adapter and a SIM card installed on the storage system.

9. The computer program product of claim 8, wherein determining availability of a primary communication system comprises sending a message through the primary communication system and waiting for a response.

10. The computer program product of claim 9, wherein the primary communication system is determined to be available upon receiving the response.

11. The computer program product of claim 9, wherein the primary communication system is determined to be unavailable upon not receiving the response for a selected amount of time.

12. The computer program product of claim 8, wherein the primary communication system is an email-based communication system.

13. The computer program product of claim 8, wherein using an SMS-based communication system further comprises communicating with the system administrator over a cellular network.

14. The computer program product of claim 13, wherein a battery is used to provide backup power to the cellular network adapter and SIM card.

15. A system for notifying a system administrator of a storage-system-related problem, the system comprising:
   at least one processor;
   at least one memory device coupled to the at least one processor and storing instructions for execution on the at least one processor, the instructions causing the at least one processor to:
   detect a problem on a storage system comprising an array of storage drives;
   determine availability of a primary communication system to notify a system administrator of the problem;
   in the event the primary communication system is available, notify the system administrator of the problem through the primary communication system; and
   in the event the primary communication system is not available due to a catastrophic event, use an SMS-based communication system to notify the system administrator of the problem, wherein using the SMS-based communication system comprises communicating using a cellular network adapter and a SIM card installed on the storage system.

16. The system of claim 15, wherein determining availability of a primary communication system comprises sending a message through the primary communication system and waiting for a response.

17. The system of claim 16, wherein the primary communication system is determined to be available upon receiving the response.

18. The system of claim 16, wherein the primary communication system is determined to be unavailable upon not receiving the response for a selected amount of time.

19. The system of claim 15, wherein the primary communication system is an email-based communication system.

20. The system of claim 15, wherein using an SMS-based communication system further comprises communicating with the system administrator over a cellular network.

* * * * *